(12) United States Patent
Malone et al.

(10) Patent No.: US 7,508,890 B1
(45) Date of Patent: *Mar. 24, 2009

(54) APPARATUS AND METHOD FOR FSK DEMODULATION WITH INTEGRATED TIME AND FREQUENCY TRACKING

(75) Inventors: Lawrence J. Malone, Carlsbad, CA (US); Aaron D. Lamb, San Diego, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 706 days.

This patent is subject to a terminal disclaimer.

(21) Appl. No.: 11/124,913

(22) Filed: May 9, 2005

Related U.S. Application Data

(63) Continuation of application No. 09/938,018, filed on Aug. 23, 2001, now Pat. No. 6,891,905.

(51) Int. Cl.
*H03D 3/00* (2006.01)
*H04L 27/14* (2006.01)

(52) U.S. Cl. .................. 375/334; 375/272; 375/335; 375/275; 329/300

(58) Field of Classification Search ............. 375/334, 375/272, 335, 275; 329/300, 301, 302, 303
See application file for complete search history.

(56) References Cited

U.S. PATENT DOCUMENTS

| | | | |
|---|---|---|---|
| 3,656,064 A | 4/1972 | Giles et al. | |
| 4,479,092 A | 10/1984 | Falconer | |
| 4,529,941 A | 7/1985 | Lipoff | |
| 4,535,297 A | 8/1985 | Puckette | |
| 4,785,255 A | 11/1988 | Lucak et al. | |
| 5,311,556 A | 5/1994 | Baker | |
| 5,373,533 A * | 12/1994 | Hayashihara et al. | 375/334 |
| 6,724,836 B1 | 4/2004 | Graf et al. | |
| 6,891,905 B1 * | 5/2005 | Malone et al. | 375/334 |
| 2003/0043947 A1 | 3/2003 | Zehavi et al. | |

* cited by examiner

*Primary Examiner*—Phuong Phu

(57) ABSTRACT

An FSK receiver comprising: 1) demodulation circuitry for receiving an incoming FSK signal and generating a baseband signal comprising an amplitude modulated symbol stream, of Logic 0 symbols and Logic 1 symbols having a data rate, R; 2) auto-correlation circuitry for sampling the baseband signal S times during each symbol and generating an auto-correlation function comprising a sample stream of N-bit samples having a data rate, S×R, and having positive-going peaks approximately coinciding with the center of the Logic 1 symbol in a 010 sequence in the baseband signal and negative-going peaks approximately coinciding with the center of the Logic 0 symbols in a 101 sequence in the baseband signal; and 3) decision circuitry for receiving the auto-correlation function and deciding a logic level of a first symbol as a function of: 1) a comparison of a signal level of a center sample of the first symbol and a mean signal level of the auto-correlation function and 2) a comparison of the signal level of the center sample of the first symbol and a signal level of a center sample of a second symbol preceding the first symbol.

17 Claims, 11 Drawing Sheets

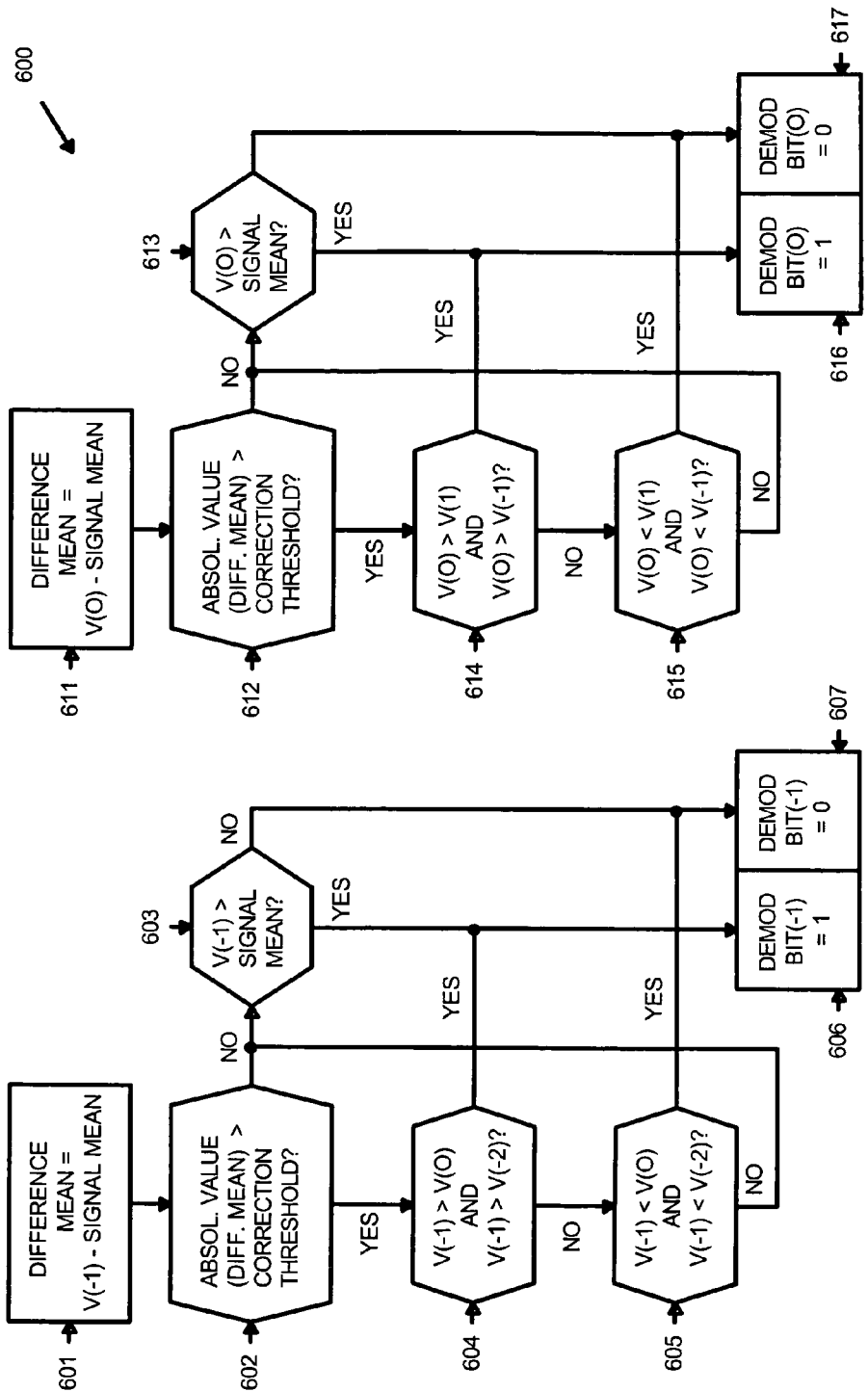

APPARATUS AND METHOD FOR FSK DEMODULATION WITH INTEGRATED TIME AND FREQUENCY TRACKING

This application is a continuation of prior U.S. patent application Ser. No. 09/938,018 filed on Aug. 23, 2001 which subsequently issued as U.S. Pat. No. 6,891,905 on May 10, 2005.

TECHNICAL FIELD OF THE INVENTION

The present invention is directed, in general, to radio frequency (RF) receivers and, more specifically, to a frequency-shift keyed (FSK) demodulator that tracks and corrects frequency drift and time drift.

BACKGROUND OF THE INVENTION

The frequency spectrum of a digital radio system is broken into channels that are small sub-spectrums. A first transmitter and receiver pair establishes a communication link over a first predetermined channel while other transmitter and receiver pairs use other predetermined channels. The transmitter transmits to the receiver over the channel using a predetermined data rate and modulation scheme (e.g., BPSK, QPSK, BFSK, QFSK).

Typically, a data transmission consists of three parts. The first part is an unmodulated carrier signal. The second part is a preamble of known information that is relatively easy for the receiver to detect and to synchronize with. The preamble may be, for example, a period of carrier signal modulated by a known training sequence (e.g., square wave) using a simple modulation scheme (i.e., BFSK). The third part of the data transmission is the modulated waveform that contains the unknown information data bits that are being transmitted.

The data rate of the transmission is usually measured in bits per second (bps), including kilobits per second (Kbps) and megabits per second (Mbps). The number of bits per second is related to the type of signaling (also known as encoding and modulation) that is used to convey the information and the number of times per second that the transmitted signal changes its value. For example, in a frequency-shift-keyed (FSK) digital signal radio system, data is encoded by generating frequency deviations away from the carrier frequency. Decoding the transmitted information entails measuring the frequency deviations away from the carrier frequency and inferring the transmitted information.

However, if the transmitted carrier frequency is at a frequency other than the nominal frequency the receiver expects, the measurement of frequency deviation becomes inaccurate. Thus, the performance and sensitivity of the receiver are degraded. This is a known problem in FSK digital radio systems. The above-described problem is depicted in greater detail in FIGS. 1A through 2B.

FIG. 1A illustrates a frequency-shift keyed (FSK) carrier signal that is properly aligned to a receiver reference carrier signal. The transmitted carrier frequency is shown as a solid line and the receiver carrier frequency is shown as a dotted line. When no data bits are being transmitted, the transmitter carrier signal is equal to some center frequency value, such as 600 MHz. The receiver carrier reference signal is aligned with the center frequency value. For, the sake of clarity, the dotted line representing the receiver carrier frequency is slightly offset in FIG. 1 from the solid line representing the transmitted carrier frequency so that the two lines do not coincide.

When data bits are transmitted, the frequency of the transmitted carrier signal is varied above and below the nominal or center frequency. These frequency variations are represented by the up and down arrows in FIG. 1A. For example, a Logic 1 may be transmitted by changing the transmitter frequency to 100 KHz above the center frequency and a Logic 0 may be transmitted by changing the transmitter frequency to 100 KHz below the center frequency. Thus, in the exemplary embodiment, a Logic 1 would be transmitted as 600.1 MHz and a Logic 0 would be transmitted as 599.9 MHz.

Within the receiver, the frequency variations in the transmitted carrier signal are translated into amplitude variations in the output voltage of a frequency discriminator or a similar circuit. FIG. 1B illustrates the amplitude modulated output of a frequency discriminator receiving an FSK carrier signal that is properly aligned with a reference voltage representing the receiver reference carrier signal. The amplitude modulated output voltage of the frequency discriminator is shown as a solid line and the reference voltage representing the receiver carrier frequency is shown as a dotted line. For the sake of clarity, the dotted line representing the amplitude modulated output voltage is slightly offset in FIG. 1B from the solid line representing the reference voltage so that the two lines do not coincide.

The amplitude modulated output voltage of the frequency discriminator is compared to the reference voltage to determine the value of the transmitted data. When no data bits are being transmitted, the amplitude modulated output voltage is equal to the reference voltage. When a Logic 1 data bit is transmitted and the transmitter frequency increases to, for example, 100 KHz above the center frequency, the frequency discriminator increases the amplitude modulated output voltage above the reference voltage. When a Logic 0 data bit is transmitted and the transmitter frequency decreases to, for example, 100 KHz below the center frequency, the frequency discriminator decreases the amplitude modulated output voltage below the reference voltage. A voltage comparator circuit translates the voltage differences into Logic 1 values and Logic 0 values. In the example shown in FIGS. 1A and 1B, the data sequence 101100 has been transmitted.

FIG. 2A illustrates a frequency-shift keyed (FSK) carrier signal that is not properly aligned to the receiver reference carrier signal. The transmitted carrier frequency has drifted to a higher center frequency than in FIGS. 1A and 1B. The transmitted carrier frequency is shown as a solid line and the receiver carrier frequency is shown as a dotted line. The receiver carrier reference frequency is so far below the new transmitted carrier frequency that positive and negative frequency variations of the transmitted carrier signal above and below the new center frequency are both higher than the receiver carrier frequency. Thus, positive and negative frequency variations are both represented by up arrows in FIG. 2A.

FIG. 2B illustrates the amplitude modulated output of a frequency discriminator receiving an FSK carrier signal that is misaligned with a reference voltage representing the receiver reference carrier signal. The amplitude modulated output voltage of the frequency discriminator is shown as a solid line and the reference voltage representing the receiver carrier frequency is shown as a dotted line. As a result of the increase in the transmitted carrier frequency, the receiver reference voltage is so far below the amplitude modulated output voltage of the frequency discriminator that positive and negative amplitude variations in the amplitude modulated output voltage are both higher than the reference voltage. As a result, comparison of the amplitude modulated output voltage and the reference voltage translates the voltage differences into inaccurate Logic 1 and Logic 0 values. In the example shown in FIGS. 2A and 2B, the transmitted data sequence is inaccurately determined to be 111111.

A receiver most accurately decodes the message when the receiver evaluates (or estimates) a bit level at the center of the bit (symbol) interval. Further degradation of the receiver performance occurs if the receiver measurements are not actually aligned to the bit (or symbol) center. During acquisition, the receiver and transmitter are synchronized in time and frequency by the preamble. However, once the receiver starts decoding the information, the receiver and transmitter drift apart in both time and frequency.

One method to re-synchronize the transmitter and the receiver frequencies is to measure the frequency difference and correct for it in the receiver. To synchronize the timing between the transmitter and receiver, the receiver must look for a known information pattern in the signal and align the decision timing in the receiver to optimize the decoding of the known information pattern. Many methods have been proposed and implemented to accomplish this.

As noted above, a conventional transmission consists of three parts: 1) an unmodulated signal, 2) a known preamble, and 3) a message containing unknown information. Typically, during signal acquisition, the receiver uses the information in the unmodulated signal and in the known preamble to attain accurate synchronization. During the third part of the message, the receiver may use a sequence-estimator demodulator to improve demodulation of the unknown information. Using this information (a decision-directed approach), the receiver tracks the time and frequency differences between the receiver and transmitter and corrects for the differences.

Traditionally, early-late gate symbol synchronization has been used in many communication systems. The operation of an early-late gate is based on the fact that the matched filtered demodulation produces an auto-correlation function that is symmetric and peaks at the optimum sampling time. FIG. 3 illustrates the relationship between the demodulated output of a frequency discriminator receiving a FSK signal and the auto-correlation function that the receiver produces to perform alignment with the received FSK signal. The demodulated waveform is a sequence of square-wave pulses and the auto-correlation function is a sequence of sawtooth-like signal peaks. At sampling time T1, a positive-going peak in the auto-correlation function is correctly aligned with the center of a Logic 1 bit in the demodulated waveform. At sampling time T2, a negative-going peak in the auto-correlation function is correctly aligned with the center of a Logic 0 bit in the demodulated waveform. If the peaks in the auto-correlation function drift away from the center of the bit periods, the early-late gate detection circuitry of the receiver automatically adjusts timing and frequency of the receiver reference signals to track and correct for the drift.

However, conventional demodulators typically make hard decisions on information symbols based on a single threshold value. This results in sub-optimal performance in the decision-making block. In particular, conventional sequence-estimation demodulators often make mistakes on bit levels that are different than the preceding and trailing bit levels, such as a 101 sequence or a 010 sequence.

Therefore, there is a need in the art for improved frequency shift keyed (FSK) receivers that are capable of more accurately adjusting for frequency and timing drifts between the incoming transmitted carrier frequency and the receiver carrier reference signal. In particular, there is a need for FSK receivers that are capable of more accurately determining bit levels that are different than the preceding and trailing bit levels.

SUMMARY OF THE INVENTION

The limitations inherent in the prior art described above are overcome by the present invention which provides an improved frequency-shift-keyed (FSK) receiver. According to an advantageous embodiment of the present invention, the FSK receiver comprises: 1) demodulation circuitry capable of receiving an incoming FSK signal and generating therefrom a baseband signal comprising an amplitude modulated symbol stream of Logic 0 symbols and Logic 1 symbols having a data rate, R; 2) auto-correlation circuitry capable of sampling the baseband signal S times during each symbol and generating an auto-correlation function comprising a sample stream of N-bit samples having a data rate, S×R, and having positive-going peaks approximately coinciding with the center of the Logic 1 symbol in a 010 sequence in the baseband signal and negative-going peaks approximately coinciding with the center of the Logic 0 symbols in a 101 sequence in the baseband signal; and 3) decision circuitry capable of receiving the auto-correlation function and deciding a logic level of a first symbol as a function of: 1) a comparison of a signal level of a center sample of the first symbol and a mean signal level of the auto-correlation function and 2) a comparison of the signal level of the center sample of the first symbol and a signal level of a center sample of a second symbol preceding the first symbol.

According to one embodiment of the present invention, the decision circuitry further decides the logic level of the first symbol as a function of a comparison of the signal level of the center sample of the first symbol and a signal level of a center sample of a third symbol following the first symbol.

According to another embodiment of the present invention, the decision circuitry is further capable of deciding a logic level of the second symbol as a function of: 1) a comparison of the signal level of the center sample of the second symbol and the mean signal level of the auto-correlation function and 2) a comparison of the signal level of the center sample of the second symbol and a signal level of a center sample of a fourth symbol preceding the second symbol.

According to still another embodiment of the present invention, the decision circuitry further decides the logic level of the second symbol as a function of a comparison of the signal level of the center sample of the second symbol and the signal level of the center sample of the first symbol.

According to yet another embodiment of the present invention, the decision circuitry is further capable of deciding a logic level of the third symbol as a function of: 1) a comparison of the signal level of the center sample of the third symbol and the mean signal level of the auto-correlation function and 2) a comparison of the signal level of the center sample of the third symbol and a signal level of a center sample of a fifth symbol following the third symbol.

According to a further embodiment of the present invention, the decision circuitry further decides the logic level of the third symbol as a function of a comparison of the signal level of the center sample of the third symbol and the signal level of the center sample of the first symbol.

According to a still further embodiment of the present invention, the decision circuitry, in response to a determination that the second symbol, the first symbol, and the third symbol comprise a 010 sequence of symbols, compares the signal level of the center sample of the first symbol with 1) a signal level of a preceding sample of the first symbol and 2) a signal level of a following sample of the first symbol to thereby determine a location of a first positive-going peak of the auto-correlation function corresponding to the first symbol.

According to a yet further embodiment of the present invention, the decision circuitry, in response to a determination that the first positive-going peak does not coincide with the center sample of the first symbol, is capable of one of advancing or delaying sampling of the baseband signal by at least one sample time period.

In one embodiment of the present invention, the decision circuitry, in response to a determination that the second symbol, the first symbol, and the third symbol comprise a 101 sequence of symbols, compares the signal level of the center sample of the first symbol with 1) a signal level of a preceding sample of the first symbol and 2) a signal level of a following sample of the first symbol to thereby determine a location of a first negative-going peak of the auto-correlation function corresponding to the first symbol.

In another embodiment of the present invention, the decision circuitry, in response to a determination that the first negative-going peak does not coincide with the center sample of the first symbol, is capable of one of advancing or delaying sampling of the baseband signal by at least one sample time period.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which:

FIGS. 6A-6C depict a flow diagram illustrating the operation by which the exemplary demodulation and time tracking logic determines (i.e., decides) the value of demodulated data bits by comparing the demodulated data bits to a signal mean reference level and to a preceding data bit and a trailing data bit according to an exemplary embodiment of the present invention;

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

Figure 1A:
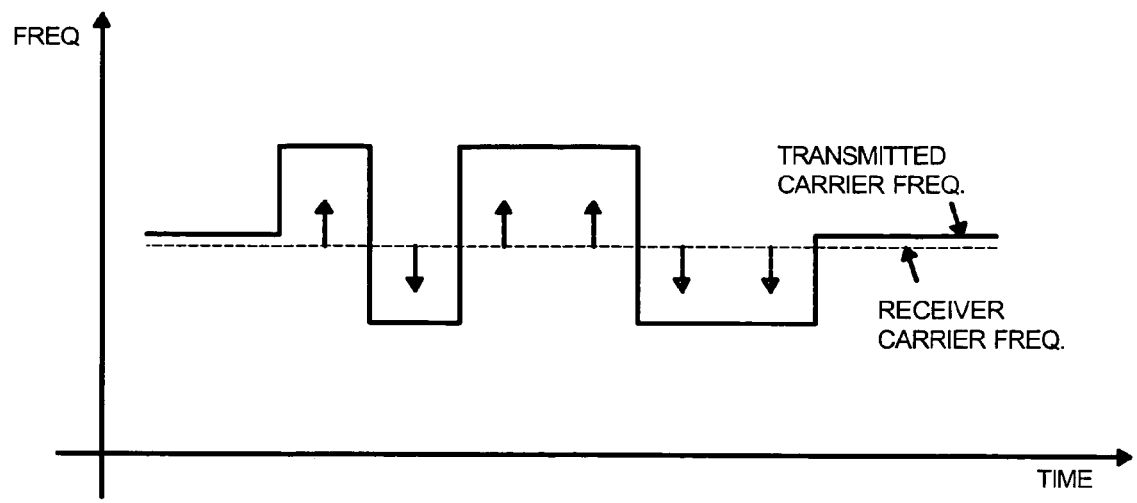
FIG. 1A illustrates a frequency-shift keyed (FSK) carrier signal that is properly aligned to a receiver reference carrier signal.
Figure 1B:
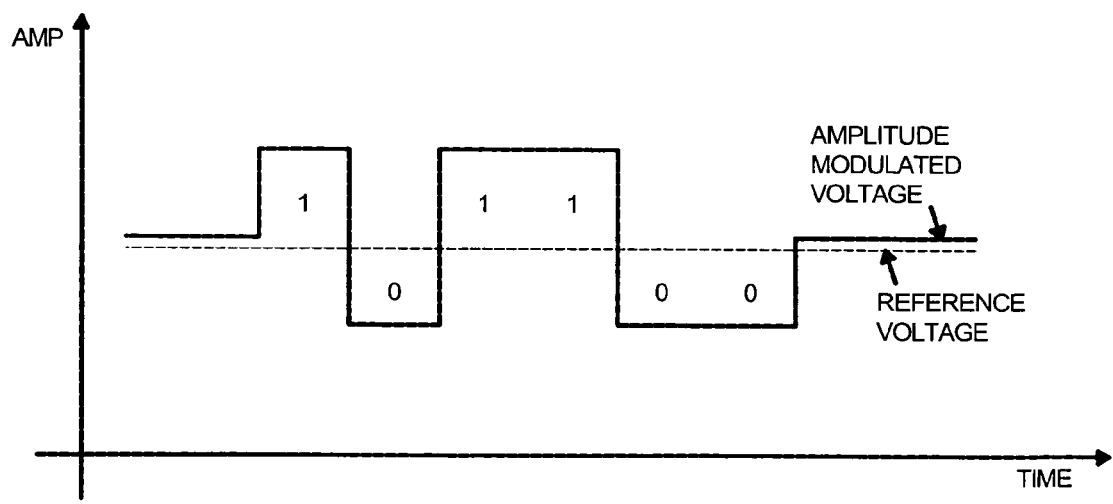
FIG. 1B illustrates the amplitude modulated output of a frequency discriminator receiving an FSK carrier signal that is properly aligned with a reference voltage representing the receiver reference carrier signal.
Figure 2A:
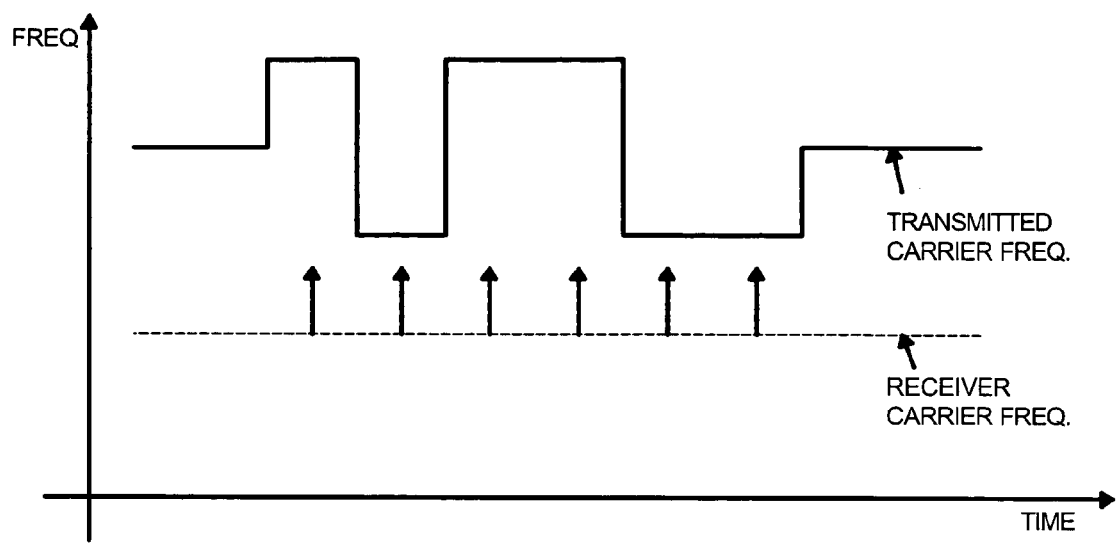
FIG. 2A illustrates a frequency-shift keyed (FSK) carrier signal that is not properly aligned to the receiver reference carrier signal.
Figure 2B:
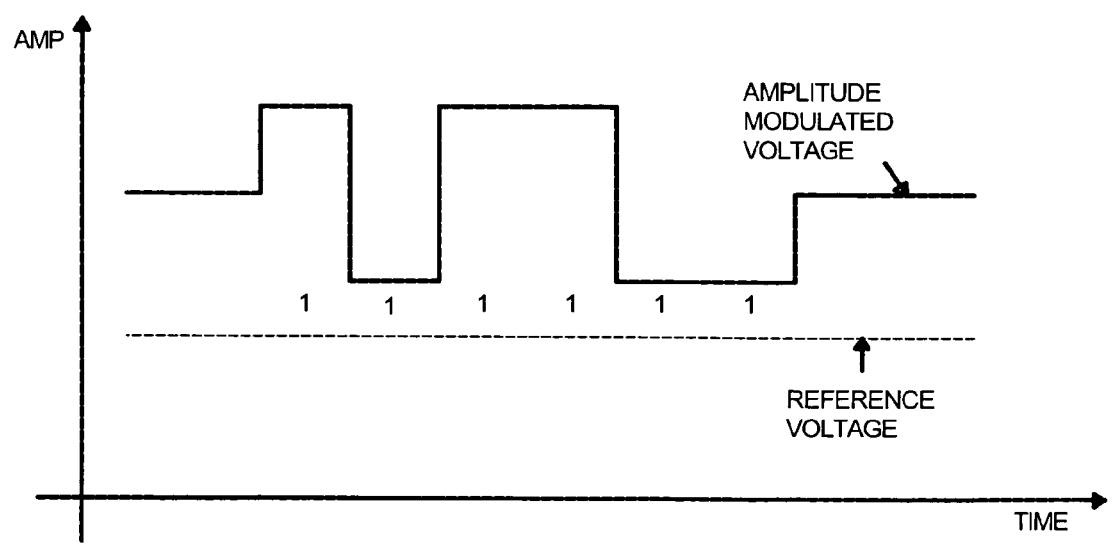
FIG. 2B illustrates the amplitude modulated output of a frequency discriminator receiving an FSK carrier signal that is misaligned with a reference voltage representing the receiver reference carrier signal.
Figure 3:
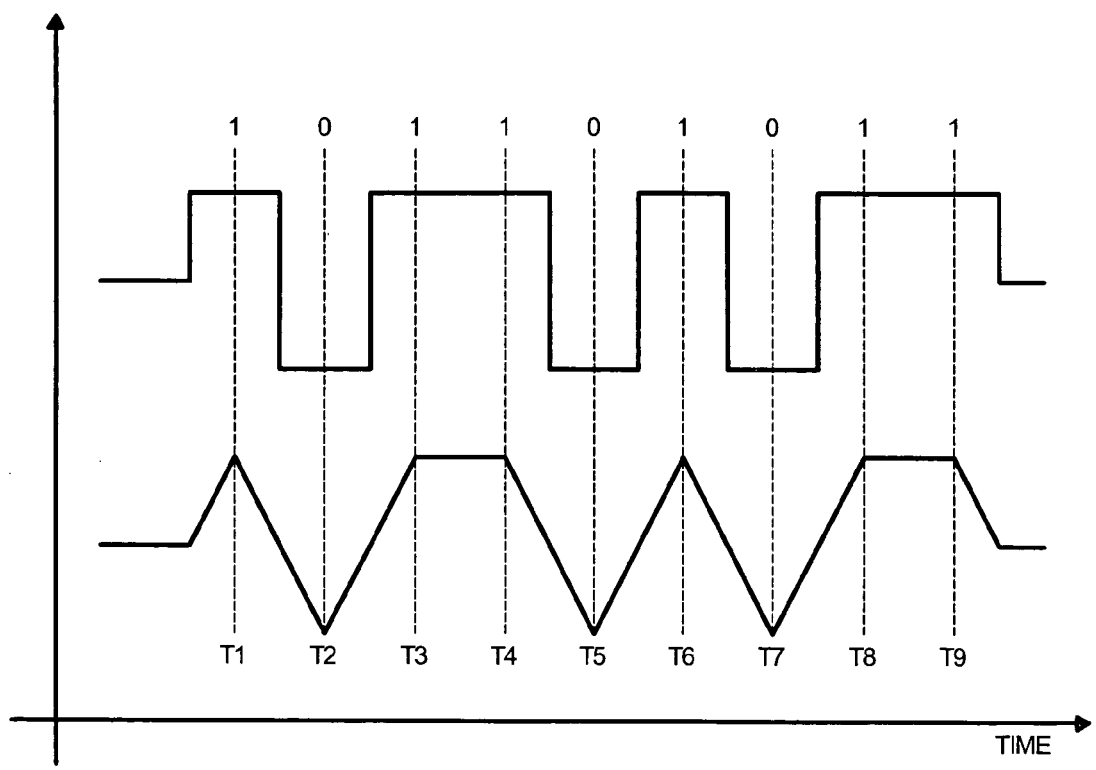
FIG. 3 illustrates the relationship between the demodulated output of a frequency discriminator receiving a FSK signal and the auto-correlation function that the receiver produces to perform alignment with the received FSK signal.
Figure 4:
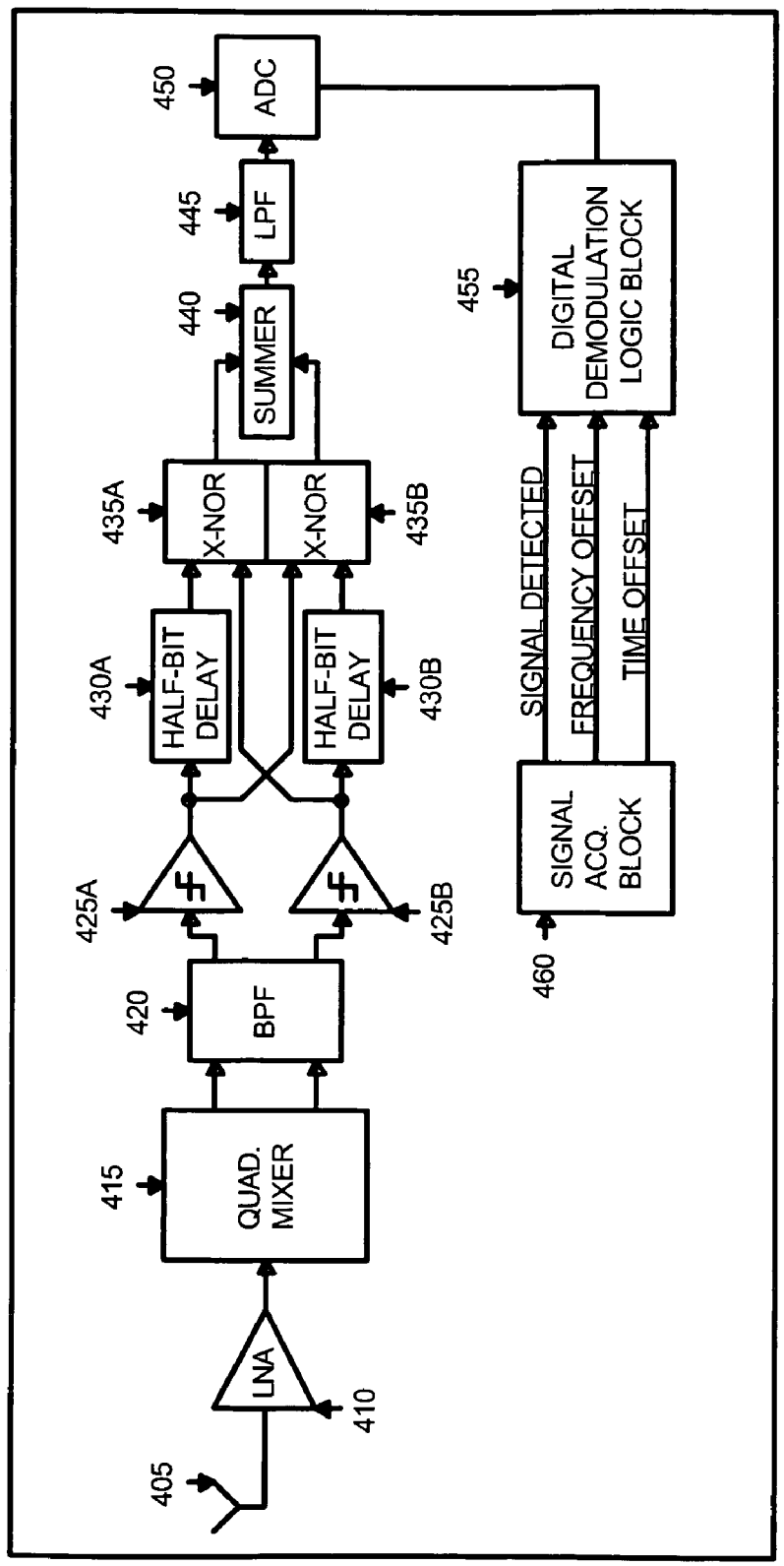
FIG. 4 is a block diagram of a frequency-shift-keyed (FSK) receiver 400 according to an exemplary embodiment of the present invention.

FIG. 4 is a block diagram of a frequency-shift-keyed (FSK) receiver 400 according to an exemplary embodiment of the present invention. FSK receiver 400 comprises antenna 405, low-noise amplifier (LNA) 410, quadrature mixer 415, bandpass filter (BPF) 420, saturation amplifiers 425A and 425B, half-bit delay elements 430A and 430B, exclusive-NOR (X-NOR) gates 435A and 435B, summer 440, low-pass filter (LPF) 445, and analog-to-digital converter (ADC) 450. FSK receiver 400 also comprises digital demodulation logic block 455 and signal acquisition block 460.

LNA 410 amplifies an incoming FSK signal received from antenna 405. The amplified. FSK signal is quadrature downmixed by quadrature mixer 415 to produce an in-phase (I) signal and a quadrature (Q) signal that are filtered by BPF 420 in order to isolate the frequencies of interest. According to an exemplary embodiment of the present invention, BPF 420 may have a center frequency at the data rate (i.e., 1 MHz) and a 3 dB bandwidth equivalent to the data rate (i.e., 500 KHz to 1.5 MHz).

The filtered outputs of BPF 420 are amplified and clipped by saturation amplifiers 425A and 425B, which have very high voltage gain. The frequency modulation is then converted to amplitude modulation by the frequency discriminator, which consists of half-bit delay elements 430A and 430B, X-NOR gates 435A and 4353, summer 440 and LPF 445. Low-pass filter 445 has a 3 dB cutoff at a value of 0.7(data rate). The output waveform from the frequency discriminator is then digitized at eight (8) times the data rate by 5-bit ADC 450.

The 5-bit binary samples from ADC 450 are sent at 8 Mbps to digital demodulation logic block 455. The 5-bit samples form an approximate digital representation of the auto-correlation function illustrated and described in FIG. 3. The 5-bit samples have values ranging from +15 to −16.

Figure 5:
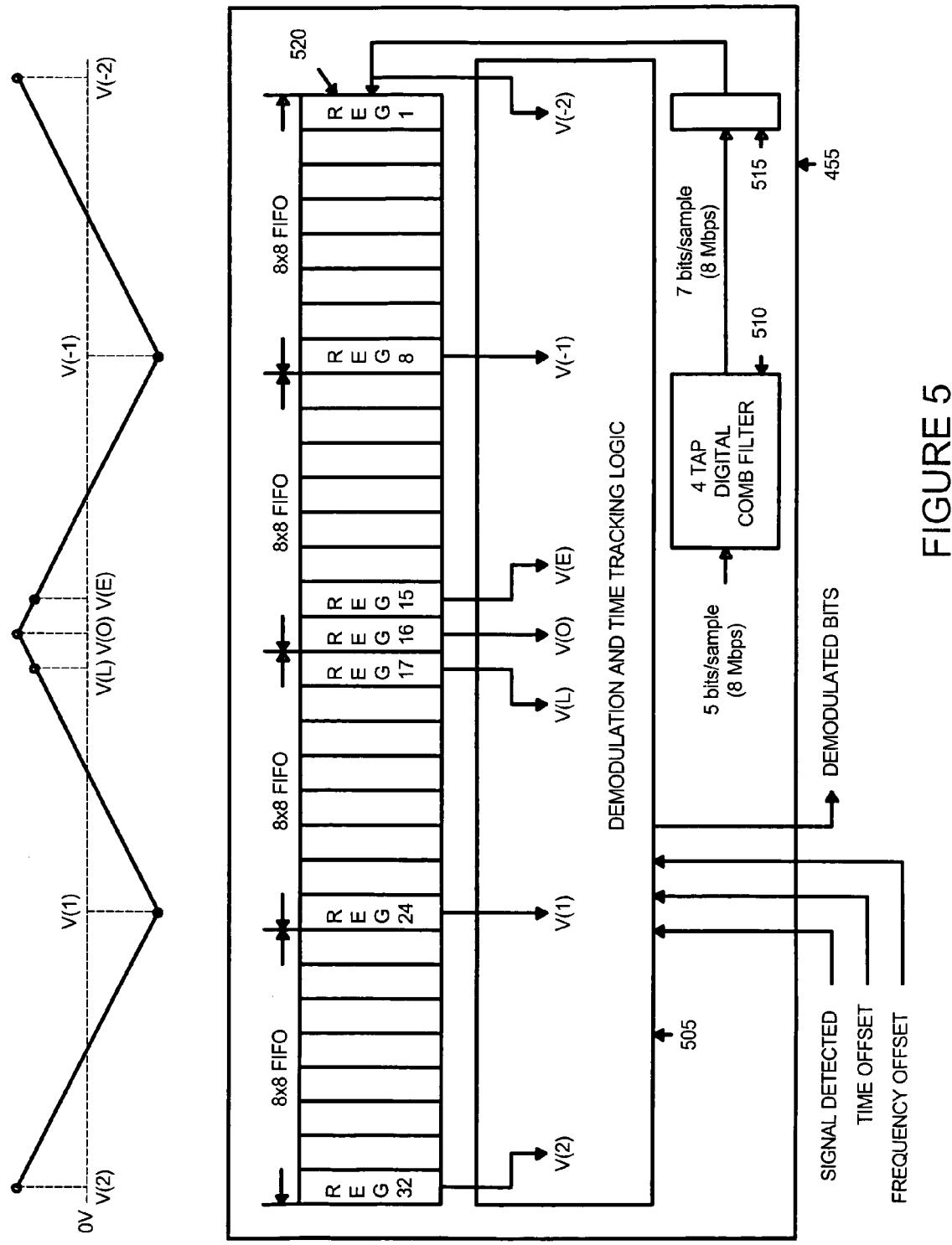
FIG. 5 illustrates the digital demodulation logic block in the exemplary frequency-shift-keyed (FSK) receiver in greater detail according to an exemplary embodiment of the present invention.

FIG. 5 illustrates digital demodulation logic block 455 in exemplary frequency-shift-keyed (FSK) receiver 400 in greater detail according to an exemplary embodiment of the present invention. Digital demodulation logic block 455 comprises demodulation and time tracking logic block 505, 4-tap digital comb filter 510, register 515, and first-in first-out (FIFO) unit 520. According to an exemplary embodiment of the present invention, FIFO unit 520 comprises thirty-two (32) 8-bit registers.

The key improvement provided by digital demodulation logic block 455 is that each bit (or symbol) is evaluated based on the values of the preceding and following bits. By examining multiple bits around the bit of interest (i.e., the bit being decided), the present invention provides more accurate demodulation. In particular, the present invention uses 101 sequences and 010 sequences to more accurately track time and frequency variations. Digital demodulation logic block 455 performs three functions:

1) sequence estimator (SE) demodulation;
2) frequency tracking; and
3) time tracking.

Comb filter 510 processes the 5-bit data samples from ADC 450 to remove quantization noise introduced by ADC 450 and to produce a better approximation to the auto-correlation function. Comb filter 510 increases the positive and negative peak sample values in the auto-correlation function relative to the samples having smaller magnitudes (i.e., near zero). The output of comb filter 510 are 7-bit values at a 8 MHz data rate.

The 7-bit samples are initially transferred into register 515 before being transferred into FIFO unit 520. Register 515 and FIFO unit 520 together form a 33 stage FIFO. Register 515 and each stage in FIFO unit 520 hold seven (7) bits. The outputs of certain registers are used by demodulation and time tracking logic 505 for time tracking, frequency tracking, and SE demodulation. An ideal auto-correlation function is shown in ideal alignment with the registers of FIFO unit 520 and register 515.

Demodulation and time tracking logic 505 receives the value. V(−2) from the output of register 515 and the value V(−1) from the output of the eighth register (REG8) in FIFO unit 520. V(−2) represents a positive peak, that is ideally aligned with the center of a Logic 1 bit and V(−1) is a negative peak that is aligned with the center of a Logic 0 bit. Demodulation and time tracking logic 505 also receives the value V(2) from the output of the thirty-second register (REG32) in FIFO unit 520 and the value V(1) from the output of the twenty-fourth register (REG24) in FIFO unit 520. V(2) represents a positive peak that is ideally aligned with the center of a Logic 1 bit and V(1) is a negative peak that is aligned with the center of a Logic 0 bit.

At the center of FIFO unit 520 are the fifteenth register (REG15), the sixteenth register (REG16), and the seventeenth register (REG17). Demodulation and time tracking logic 505 receives the value V(O) from the output of REG16 in FIFO unit 520, the value V(E) from the output of REG15, and the value V(L) from the output of REG17. V(O) represents a positive peak that is ideally aligned with the center of a Logic 1 bit.

A total of five logic bits are in FIFO unit 520 and register 515. Each logic bit is represented by eight samples in FIFO unit 520 and register 515. V(O) is the center sample of the current logic bit that is being decided by demodulation and time tracking logic 505. V(O) represents the Value(On-Time) sample, V(E) represents the Value(Early) sample, and V(L) represents the Value(Late) sample. V(2) is the center of the logic bit that preceded the current logic bit by two. V(1) is the center of the logic bit that immediately preceded the current logic bit. V(−2) is the center of the logic bit that trails the current logic bit by two. V(−1) is the center of the logic bit that immediately follows the current logic bit. Since V(O) is a positive peak (i.e., Logic 1) and V(1) and V(−1) are negative peaks (i.e., Logic 0), demodulation and time tracking logic 505 is evaluating a 010 sequence. The total sequence from V(2) to V(−2) is 10101.

As will be described below in greater detail, demodulation and time tracking logic 505 uses V(L), V(O) and V(E) to track time and frequency drift and to generate corrections to better synchronize demodulation in FSK receiver 400. When alignment is correct, V(O) has a greater magnitude than the two surrounding samples, V(E) and V(L). Thus, for a Logic 1, the value of V(O) is more positive than the V(E) and V(L) values and, for a Logic 0, the value of V(O) is more negative than the V(E) and V(L) values. If this is not the case, demodulation and time tracking logic 505 generates time and frequency correction signals that either advance or delay the demodulation of V(O) in order to properly synchronize FSK receiver 400.

Demodulation and time tracking logic 505 does a sliding window average (i.e., 4-tap comb filter) on the signal in effect producing a matched filter auto-correlation on the discriminated data. Demodulation and time tracking logic 505 receives a Signal Detected signal, an Initial Time Offset signal, and an Initial Frequency Offset signal from signal acquisition block 460, which identifies the center of bit-time. Thereafter, once every bit-time, demodulation and time tracking logic 505 makes a decision as to the value of the new symbol. In addition, once every bit-time (i.e., once every 8 samples), demodulation and time tracking logic 505 performs time and mean frequency tracking.

In general, due to noise, inter-symbol interference (ISI), and the filtering affects of the transmitter and receiver, decoding the Logic 1 in a 010 bit sequence and the Logic 0 in a 101 bit sequence are the most likely decisions to cause errors. To reduce complexity, the present invention focuses on increasing the probability of correctly decoding 010 and 101 combination of bits. The present invention compensates for inter-symbol interference and system noise in the case of 010 and 101 bit combinations. Demodulation and time tracking logic 505 makes a decision for each symbol (either a Logic 1 or a Logic 0) based upon the value of each symbol compared to the mean value of the signal, as well as the value of each symbol compared to the values of the preceding symbol and the trailing symbol. In other cases, such as 111 bit patterns, the only criteria for decision is based on the bit value compared to the signal mean.

Keeping the transmitter and receiver synchronized in time improves demodulator performance. This operation of an early-late gate is based on the fact that the demodulated BFSK waveform is the basic pulse used in the transmission. Comb filter 510 produces an auto-correlation peak at the optimum sampling time for 010 and 101 bit pattern combinations. For 010 and 101 combinations, demodulation and time tracking logic 505 examines adjacent samples (i.e., V(L) and V(E)) and if either is larger than center value, V(O), the optimum sampling time is adjusted in that direction.

The mean value of the signal is the difference in transmitter carrier and receiver carrier frequencies and is used in demodulation. Any drift in the carrier frequency results in a shift of the mean value. The present invention accumulates symbol amplitudes for four 010 bit patterns and four 101 bit-patterns. The result is filtered and added to the present mean value, creating a new mean that tracks the frequency offset. To track the mean, demodulation and time tracking logic 505 detects 010 and 101 sequences and finds the average value of the center bit of each combination and then averages those values together to find the new mean.

FIGS. 6-8 are flow diagrams illustrating the operation of selected functions in demodulation and time tracking logic 505 according to an advantageous embodiment of the present invention. Those skilled in the art will recognize that the functions performed by demodulation and time tracking logic 505 may be implemented by a wide variety of circuit architectures. These architectures are generally interchangeable and no particular circuit layout is preferred. In particular, demodulation and time tracking logic 505 may be implemented using one or more application specific integrated circuit (ASIC) chips, including an ASIC chip that may contain an embedded digital signal processor (DSP).

Figure 6C:
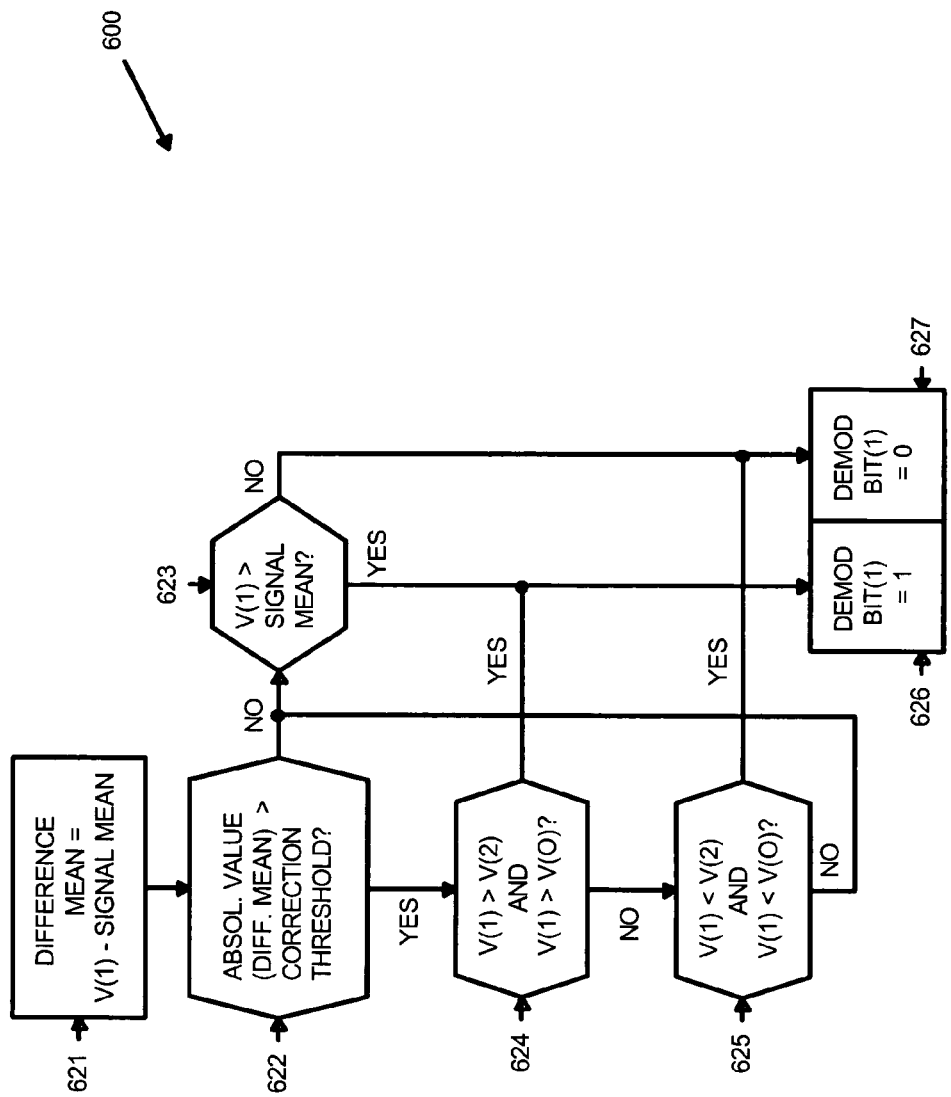

FIGS. 6A-6C depict flow diagram 600, which illustrates the operation by which demodulation and time tracking logic 505 determines (i.e.; decides) the value of demodulated data bits by comparing the demodulated data bits to a signal mean reference level and to a preceding data bit and a trailing data bit. The algorithm executed by demodulation and time tracking logic 505 and illustrated by FIGS. 6A-6C begins every 1 bit-time and is initially synchronized to the estimate of the bit-time center given by signal acquisition block 460. If the symbol (bit) value its within a certain region around the mean value, demodulation and time tracking logic 505 exploits the information in the surrounding bits to determine its binary value.

In FIG. 6A, demodulation and time tracking logic 505 decides the logic level of the V(−1) value with respect to the signal mean and the V(O) value (i.e., the preceding bit) and the V(−2) value (i.e., the trailing bit). Initially, demodulation and time tracking logic 505 calculates a Difference Mean equal to the difference between the V(−1) value and the signal mean (process step 601). Next, demodulation and time tracking logic 505 determines whether the absolute value of the Difference Mean exceeds a Correction Threshold value (process step 602). In other words, demodulation and time tracking logic 505 determines if the V(−1) value is above or below the signal mean by more than the amount of the Correction Threshold value. By way of example, if the signal mean is 0 and the Correction Threshold value is 10, demodulation and time tracking logic 505 tests to determine whether the V(−1) value is above +10 or below −10.

If the absolute value of the Difference Mean does not exceed the Correction Threshold value, then demodulation and time tracking logic 505 determines if V(−1) is greater than the signal mean (process step 603). If YES, then demodulation and time tracking logic 505 determines (decides) that the V(−1) value is a Logic 1 (i.e., Demod Bit(−1) =1) (process step 606). If NO, then demodulation and time tracking logic 505 determines (decides) that the V(−1) value is a Logic 0 (i.e., Demod Bit(−1)=01) (process step 607).

If the absolute value of the Difference Mean does exceed the Correction Threshold value, then demodulation and time tracking logic 505 determines if V(−1) is greater than both the V(O) value and the V(−2) value (process step 604). If YES, then demodulation and time tracking logic 505 determines (decides) that the V(−1) value is a Logic 1 (i.e., Demod Bit(−)=1) (process step 606). If NO, then demodulation and time tracking logic 505 determines if V(−1) is less than both the V(O) value and the V(−2) value (process step 605). If YES, then demodulation and time tracking logic 505 determines (decides) that the V(−1) value is a Logic 0 (i.e., Demod Bit(−1)=0) (process step 607). If NO, then demodulation and time tracking logic 505 determines if V(−1) is greater than the signal mean (process step 603). If YES, then demodulation and time tracking logic 505 determines (decides) that the V(−1) value is a Logic 1 (i.e., Demod Bit(−1)=1) (process step 606). If NO, then demodulation and time tracking logic 505 determines (decides) that the V(−1) value is a Logic 0 (i.e., Demod Bit(−1)=0) (process step 607).

In FIGS. 6B and 6C, the V(O) value and the V(−2) value are decided in a similar manner to the V(−1) value depicted in process steps 601-607. In FIG. 6B, demodulation and time tracking logic 505 decides the logic level of the V(O) value with respect to the signal mean and the V(1) value (i.e., the preceding bit) and the V(−1) value (i.e., the trailing bit) (see process steps 611-617). In FIG. 6C, demodulation and time tracking logic 505 decides the logic level of the V(1) value with respect to the signal mean and the V(2) value (i.e., the preceding bit) and the V(O) value (i.e., the trailing bit) (see process steps 621-627).

Figure 7A:
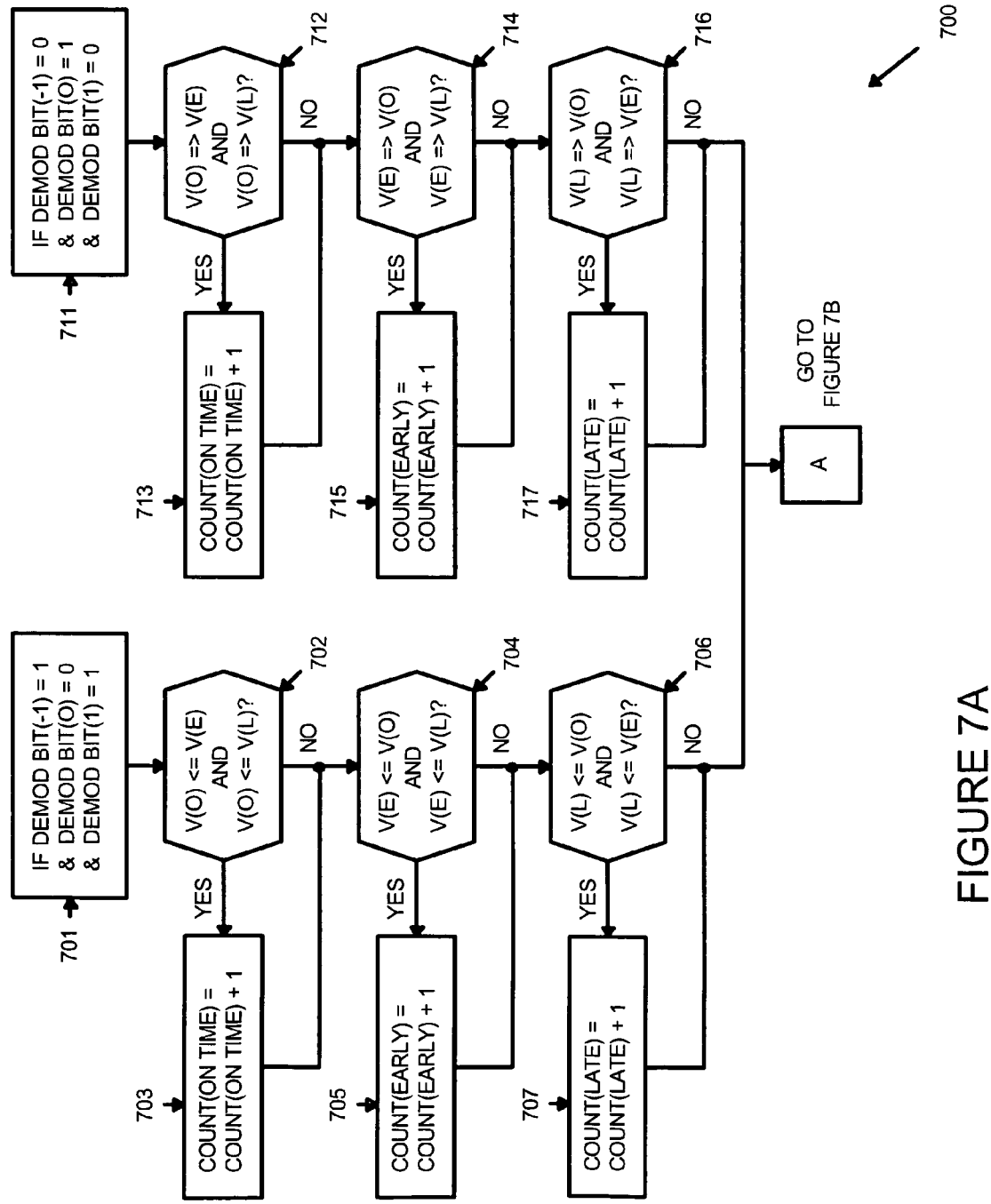
FIGS. 7A and 7B depict a flow diagram illustrating the time tracking operation performed by the demodulation and time tracking logic according to one embodiment of the present invention.
Figure 7B:
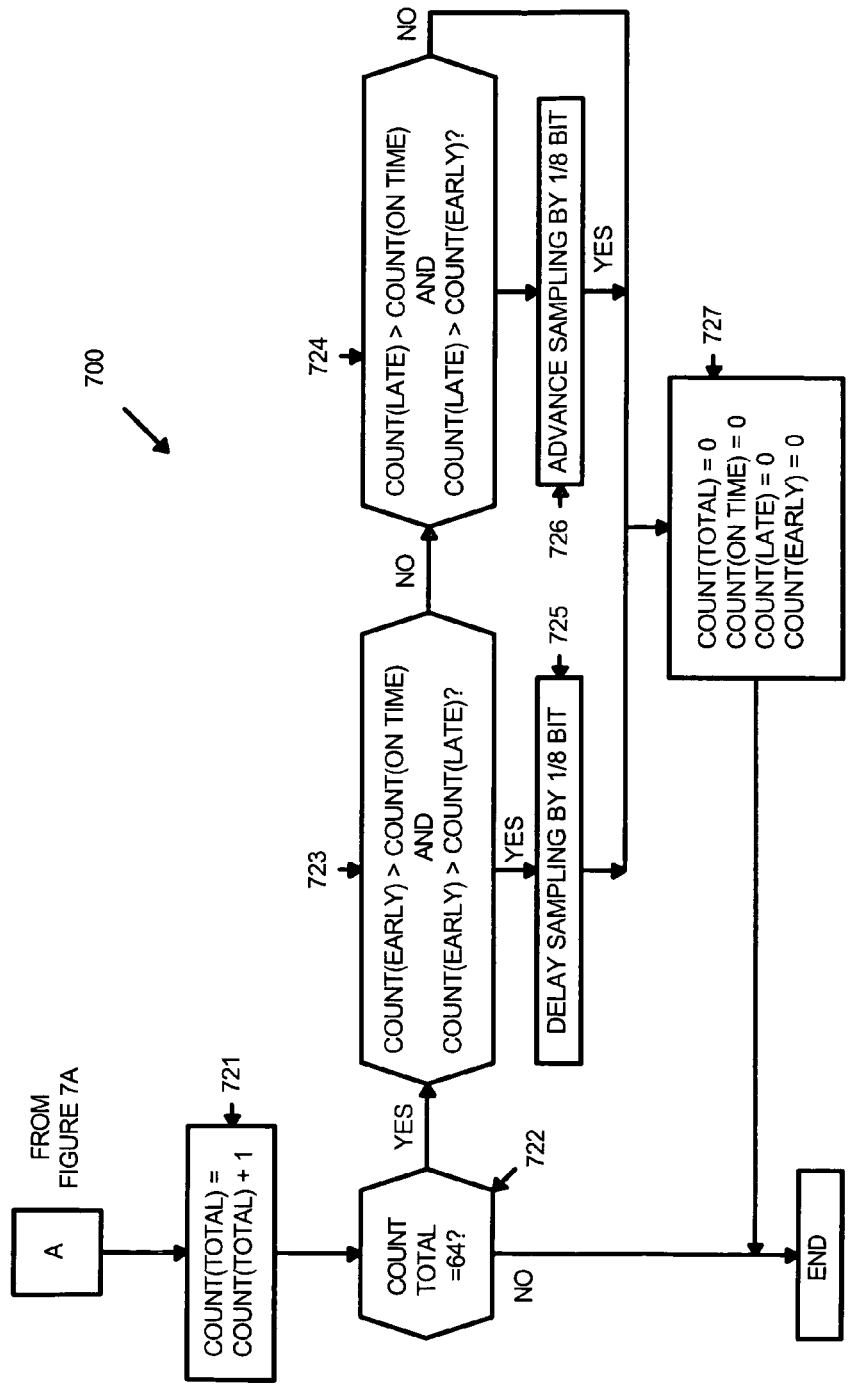

FIGS. 7A and 7B depict flow diagram 700, which illustrates the time tracking operation performed by demodulation and time tracking logic 505 according to an exemplary embodiment of the present invention. The algorithm executed by demodulation and time tracking logic 505 and illustrated in FIGS. 7A and 7B begins every 1 bit-time is initially synchronized to the estimate of the bit-time center given by signal acquisition block 460. The auto-correlation function has the property that it is symmetric and peaks at the optimum sampling time. That means 010 and 101 bit patterns will have observable peaks which can be used to track timing differences between the transmitter and the receiver. Upon determining the center time is ⅛ of a bit time before/after the current time, the next demodulation instant is delay/accelerated ⅛ bit.

If demodulation and time tracking logic 505 determines that Demod Bit(1), Demod Bit(O), and Demod Bit(−1) comprise either a 101 sequence or a 010 sequence, demodulation and time tracking logic 505 compares the V(O) value to the V(E) value and the V(L) value to determine if the corresponding negative-going peak or positive-going peak in the auto-correlation function is properly aligned with REG16 in FIFO unit 520 (i.e., peak occurs at V(O)).

If a 101 sequence is detected (process step 701), demodulation and time tracking logic 505 determines if the V(O) value is less than or equal to the V(E) and V(L) values (process step 702). If YES, then the negative-going peak in the auto-correlation function is properly aligned with REG16 and the V(O) value and demodulation and time tracking logic 505 increments the COUNT(ON TIME) value in an internal counter (process step 703). If NO, then demodulation and time tracking logic 505 determines if the V(E) value is less than or equal to the V(O) and V(L) values (process step 704). If YES, then the V(E) value and REG 15 are closer to the negative-going peak, indicating that the peak occurs earlier than REG16 and the V(O) value. In response, demodulation and time tracking logic 505 increments the COUNT(EARLY) value in an internal counter (process step 705). If NO, then demodulation and time tracking logic 505 determines if the V(L) value is less than or equal to the V(O) and V(E) values (process step 706). If YES, then the V(L) value and REG 17 are closer to the negative-going peak, indicating that the peak occurs later than REG16 and the V(O) value. In response, demodulation and time tracking logic 505 increments the COUNT(LATE) value in an internal counter (process step 707).

If demodulation and time tracking logic 505 determines that the V(L) value is not less than or equal to the V(O) and V(E) values (process step 706), or after completion of process step 707, demodulation and time tracking logic 505 increments the COUNT(TOTAL) value in an internal counter (process step 721).

If a 010 sequence is detected (process step 711), demodulation and time tracking logic 505 determines if the V(O) value is greater than or equal to the V(E) and V(L) values (process step 712). If YES, then the positive-going peak in the correlation function is properly aligned with REG16 and the V(O) value and demodulation and time tracking logic 505 increments the COUNT(ON TIME) value in an internal counter (process step 713). If NO, then demodulation and time tracking logic 505 determines if the V(E) value is greater than or equal to the V(O) and V(L) values (process step 714). If YES, then the V(E) value and REG 15 are closer to the positive-going peak, indicating that the peak occurs earlier than REG16 and the V(O) value. In response, demodulation and time tracking logic 505 increments the COUNT(EARLY) value in an internal counter (process step 715). If NO, then demodulation and time tracking logic 505 determines if the V(L) value is greater than or equal to the V(O) and V(E) values (process step 716) If YES, then the V(L) value and REG 17 are closer to the positive-going peak, indicating that the peak occurs later than REG16 and the V(O) value. In response, demodulation and time tracking logic 505 increments the COUNT(LATE) value in an internal counter (process step 717).

If demodulation and time tracking logic 505 determines that the V(L) value is not grater than or equal to the V(O) and V(E) values (process step 706), or after completion of process step 717, demodulation and time tracking logic 505 increments the COUNT(TOTAL) value in an internal counter (process step 721).

After each evaluation of Demod Bit(1), Demod Bit(O), and Demod Bit(-1) to detect 101 and 010 sequences, demodulation and time tracking logic 505 determines if COUNT(TOTAL) is equal to 64 (process step 722). If NO, then demodulation and time tracking logic 505 evaluates the next sequence of Demod Bit(1) Demod Bit(O), and Demod Bit(-1) values.

If COUNT(TOTAL) does equal 64, then demodulation and time tracking logic 505 determines if COUNT(EARLY) is greater than COUNT(ON TIME) and COUNT(LATE) (process step 723). If YES, then samples are being evaluated too early and demodulation and time tracking logic 505 generates a time tracking correction factor that delays sampling by ⅛ of a bit-width (i.e., 1 sample time period) (process step 725). Demodulation and time tracking logic 505 then resets the COUNT(TOTAL) value, the COUNT(EARLY) value, the COUNT(ON TIME) value, and the COUNT(LATE) value to zero (process step 727) and then evaluates the next sequence of Demod Bit(1), Demod Bit(O), and Demod Bit(-1) values.

If NO (i.e., COUNT (EARLY) is not greater than COUNT (ON TIME) and COUNT(LATE)), then demodulation and time tracking logic 505 determines if COUNT(LATE) is greater than COUNT(ON TIME) and COUNT(EARLY) (process step 724). If YES, then samples are being evaluated too late and demodulation and time tracking logic 505 generates a time tracking correction factor that advances sampling by ⅛ of a bit-width (i.e., 1 sample time period) (process step 726). Demodulation and time tracking logic 505 then resets the COUNT(TOTAL) value, the COUNT(EARLY) value, the COUNT(ON TIME) value, and the COUNT (LATE) value to zero (process step 727) and then evaluates the next sequence of Demod Bit(1), Demod Bit(O), and Demod Bit(-1) values.

If NO (i.e, COUNT(LATE) is not greater than COUNT (ON TIME) and COUNT(EARLY)), then COUNT(ON TIME) is greater than both COUNT (EARLY) and COUNT (LATE) and the samples are being evaluated at approximately the correct time. In response, demodulation and time tracking logic 505 resets the COUNT(TOTAL) value, the COUNT (EARLY) value, the COUNT(ON TIME) value, and the COUNT(LATE) value to zero (process step 727) and then evaluates the next sequence of Demod Bit(1), Demod Bit (0), and Demod Bit(-1) values.

Figure 8A:
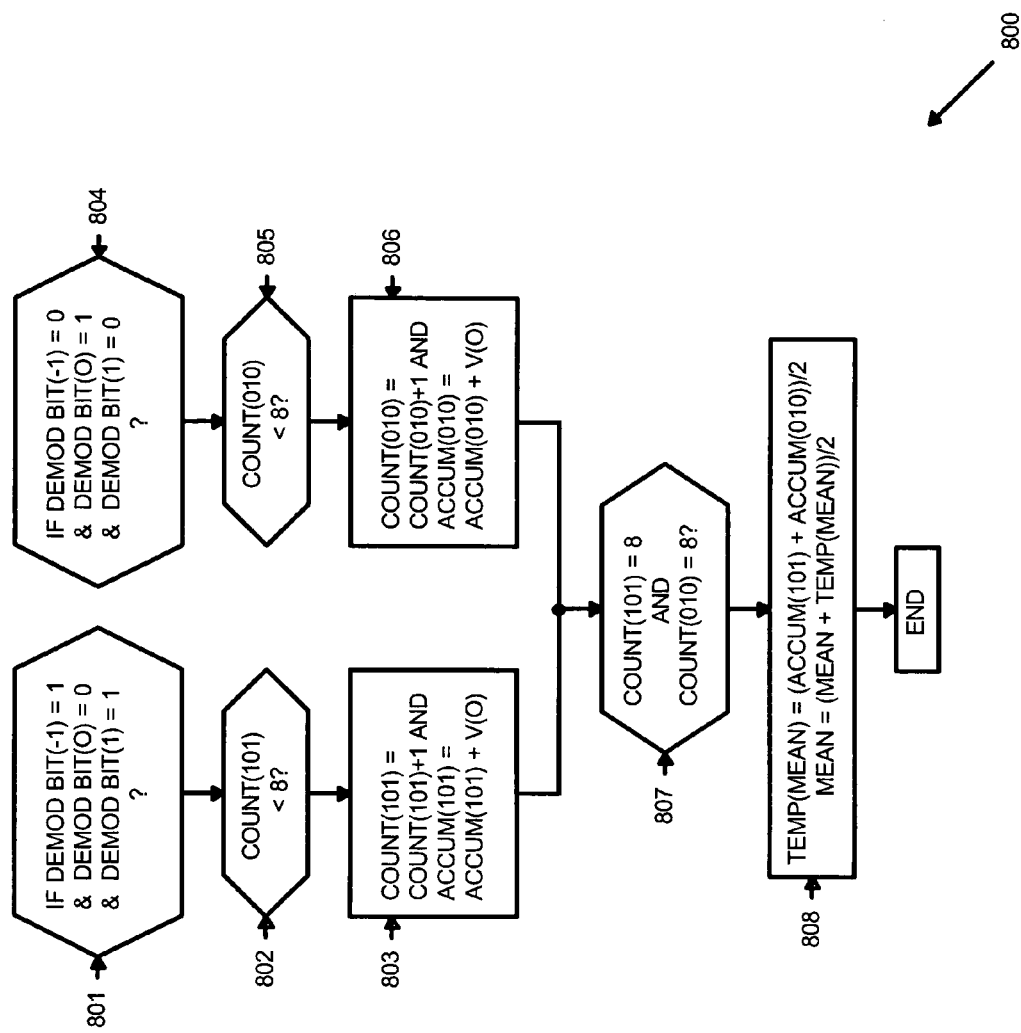
FIGS. 8A and 8B depict a flow diagram illustrating the frequency mean tracking operation performed by the demodulation and time tracking logic according to an exemplary embodiment of the present invention.
Figure 8B:
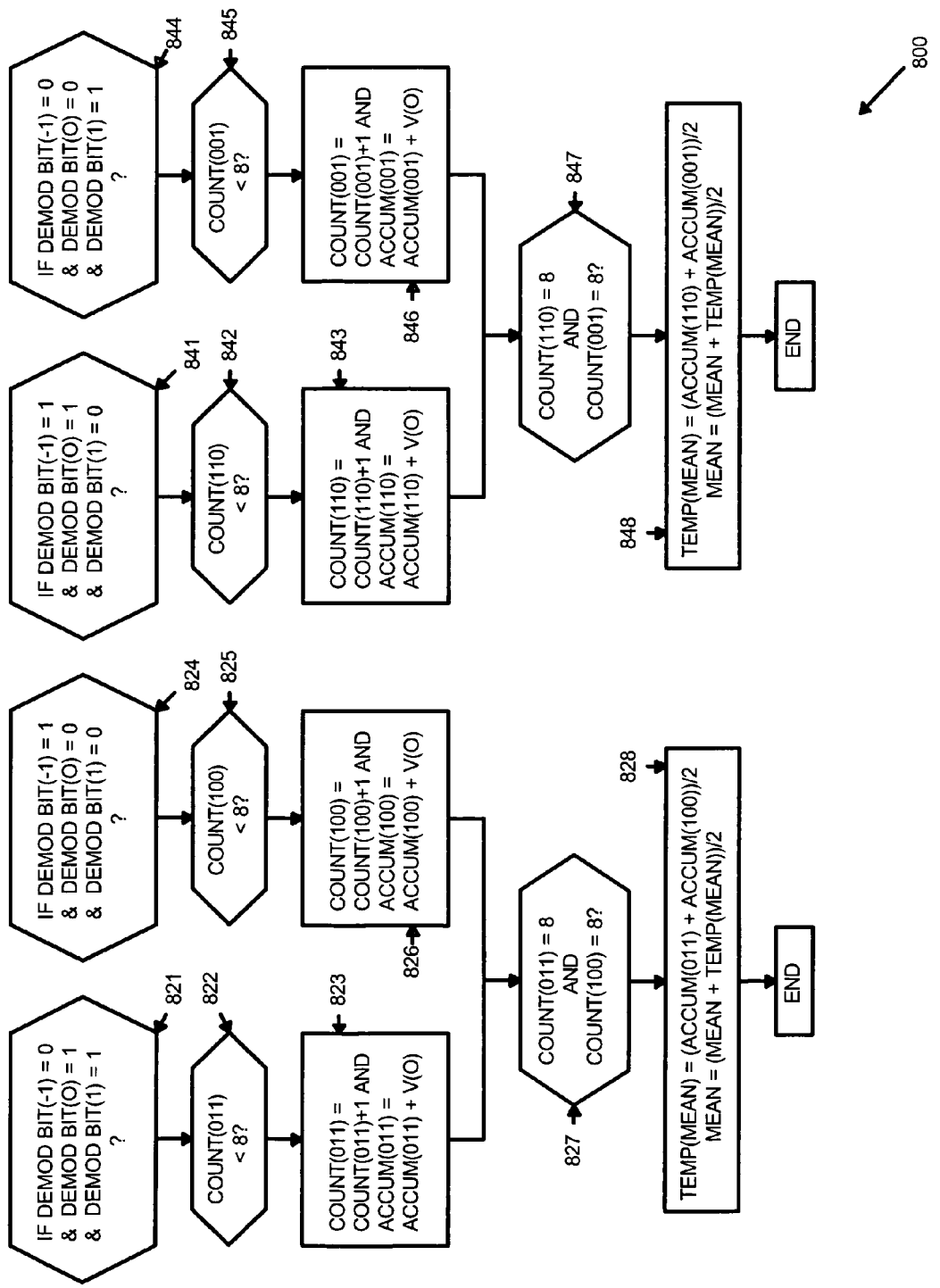

FIGS. 8A and 8B depict flow diagram 800, which illustrates the frequency mean tracking operation performed by demodulation and time tracking logic 505 according to an exemplary embodiment of the present invention. The algorithm executed by demodulation and time tracking logic 505 and illustrated in FIGS. 8A and 8B begins every 1 bit-time is initially synchronized to the estimate of the bit-time center given by signal acquisition block 460. Again, the auto-correlation has the property that it is symmetric and peaks at the optimum sampling time. By exploiting patterns in the data, demodulation and time tracking logic 505 in FSK receiver 400 can track out the frequency drift between the transmitter and receiver. In this case, demodulation and time tracking logic 505 averages the signal levels of the 010 and 101 sequences to produce an estimate of the transmitter and receiver frequency differences. This average value is then averaged with the previous (i.e., old) average to provide a new demodulation threshold.

Demodulation and time tracking logic 505 maintains internal counters of the number of 101 and 010 sequences that occur. In the exemplary embodiment, the frequency mean is updated after eight occurrences of a 010 sequence and eight occurrences of a 101 sequence. If a 101 sequence is detected (process step 801), demodulation and time tracking logic 505 determines if the COUNT(101) value in an internal counter is less than eight (process step 802). If YES, demodulation and time tracking logic 505 increments the COUNT(101) value and adds the current V(O) value to the ACCUM(101) value in an internal accumulator (process step 803). Similarly, if a 010 sequence is detected (process step 804), demodulation and time tracking logic 505 determines if the COUNT(010) value in an internal counter is less than eight (process step 805). If YES, demodulation and time tracking logic 505 increments the COUNT(010) value and adds the current V(O) value to the ACCUM(010) value in an internal accumulator (process step 806).

After completion of process step 803 or process step 806, demodulation and time tracking logic 505 determines if the COUNT(101) value and the COUNT(010) value in the internal counters are equal to eight (process step 807). If YES, demodulation and time tracking logic 505 calculates a temporary frequency average value, TEMP(MEAN), by adding the ACCUM(101) value and the ACCUM(1) value and dividing by two. Demodulation and time tracking logic 505 also calculates a new frequency average, MEAN, by adding the old MEAN value to the TEMP(MEAN) value and dividing by two (process step 808).

FIG. 8B illustrates the frequency mean tracking operation performed by demodulation and time tracking logic 505, which also averages the signal levels of the 011, 100, 110, and 001 sequences to produce an estimate of the transmitter and receiver frequency differences. These operations are similar to process steps 801-808 described above. In process steps 821-828, demodulation and time tracking logic 505 updates the frequency average, MEAN, based on eight 011 sequences and eight 100 sequences. In process steps 841-848, demodulation and time tracking logic 505 updates the frequency average, MEAN, based on eight 110 sequences and eight 001 sequences.

It should be understood that the particular architecture of FSK receiver 400 illustrated in FIG. 4 above is by way of illustration only and should not be construed so as to limit that scope of the present invention in general, the present invention may be implemented with any demodulation and filtering architecture capable of receiving an incoming FSK signal, generating a baseband signal comprising a sequence of Logic 0 and Logic 1 bits and further capable of generating from the baseband signal an auto-correlation function having positive-going peaks coinciding with the center of the Logic 1 bit in a 010 sequence in the baseband signal and having negative-going peaks coinciding with the center of the Logic 0 bit in a 101 sequence in the baseband signal.

Furthermore, the particular architecture of digital demodulation logic block 455 is by way of illustration only and should not be construed so as to limit that scope of the present invention. For example, it is not required that each data bit in the baseband signal be sampled eight times per bit-width and that FIFO unit 520 contain 32 registers. In an alternate embodiment, each bit in the baseband signal may be sampled, for example, 4 times, 6 times, or 16 times per bit-width and FIFO unit 520 may contain 16 registers, 24 registers, or 64 registers.

Also, it is not require that the V(E) sample be the sample that immediately follows the V(O) sample or that the V(L) sample be the sample immediately preceding the V(O) sample. For example, in an alternate embodiment of the present invention, V(L) may be read from REG18 or REG 19 in FIFO unit 520 and V(E) may be read from REG 14 or REG13 in FIFO unit 520.

Although the present invention has been described in detail, those skilled in the art should understand that they can make various changes, substitutions and alterations herein without departing from the spirit and scope of the invention in its broadest form.

What is claimed is:

1. A frequency-shift-keyed (FSK) receiver, comprising:
   demodulation circuitry capable of receiving an incoming FSK signal and generating a baseband signal;
   auto-correlation circuitry capable of sampling the baseband signal and generating an auto-correlation function, the auto-correlation function having a positive-going peak approximately coinciding with a center of a Logic 1 symbol in the baseband signal and having a negative-going peak approximately coinciding with a center of a Logic 0 symbol in the baseband signal; and
   decision circuitry capable of deciding a logic level of a first symbol using the auto-correlation function wherein the decision circuitry is capable of deciding the logic level of the first symbol by comparing a signal level of a center sample of the first symbol and a mean signal level of the auto-correlation function.

2. The FSK receiver as set forth in claim 1, wherein the decision circuitry is capable of deciding the logic level of the first symbol further by at least one of:
   comparing the signal level of the center sample of the first symbol and a signal level of a center sample of a second symbol preceding the first symbol; and
   comparing the signal level of the center sample of the first symbol and a signal level of a center sample of a third symbol following the first symbol.

3. The FSK receiver as set forth in claim 2, wherein the decision circuitry is further capable of deciding the logic level of the second symbol by comparing the signal level of the center sample of the second symbol and the mean signal level of the auto-correlation function.

4. The FSK receiver as set forth in claim 3, wherein the decision circuitry is further capable of deciding the logic level of the third symbol by comparing the signal level of the center sample of the third symbol and the mean signal level of the auto-correlation function.

5. The FSK receiver as set forth in claim 4, wherein:
   in response to determining that the second symbol, the first symbol, and the third symbol comprise a 010 sequence of symbols, the decision circuitry is capable of comparing the signal level of the center sample of the first symbol with at least one of (i) a signal level of a preceding sample of the first symbol and (ii) a signal level of a following sample of the first symbol to determine a location of the positive-going peak of the auto-correlation function corresponding to the first symbol.

6. The FSK receiver as set forth in claim 4, wherein:
   in response to determining that the second symbol, the first symbol, and the third symbol comprise a 101 sequence of symbols, the decision circuitry is capable of comparing the signal level of the center sample of the first symbol with at least one of (i) a signal level of a preceding sample of the first symbol and (ii) a signal level of a following sample of the first symbol to determine a location of the negative-going peak of the auto-correlation function corresponding to the first symbol.

7. The FSK receiver as set forth in claim 4, wherein:
   in response to determining that the positive-going peak or the negative-going peak does not coincide with the center sample of the first symbol, the decision circuitry is capable of advancing or delaying sampling of the baseband signal by at least one sample time period.

8. The FSK receiver as set forth in claim 1, wherein:
   the positive-going peak approximately coincides with the center of the Logic 1 symbol in a 010 sequence in the baseband signal; and
   the negative-going peak approximately coincides with the center of the Logic 0 symbols in a 101 sequence in the baseband signal.

9. A frequency-shift-keyed (FSK) device, comprising:
   an antenna capable of providing an incoming FSK signal; and
   an FSK receiver comprising:
   demodulation circuitry capable of receiving the incoming FSK signal and generating a baseband signal;
   auto-correlation circuitry capable of sampling the baseband signal and generating an auto-correlation function, the auto-correlation function having a positive-going peak approximately coinciding with a center of a Logic 1 symbol in the baseband signal and having a negative-going peak approximately coinciding with a center of a Logic 0 symbol in the baseband signal; and
   decision circuitry capable of deciding a logic level of a first symbol using the auto-correlation function wherein the decision circuitry is capable of deciding the logic level of the first symbol by comparing a signal level of a center sample of the first symbol and a mean signal level of the auto-correlation function.

10. The FSK device as set forth in claim 9, wherein the decision circuitry is capable of deciding the logic level of the first symbol further by at least one of:

comparing the signal level of the center sample of the first symbol and a signal level of a center sample of a second symbol preceding the first symbol; and comparing the signal level of the center sample of the first symbol and a signal level of a center sample of a third symbol following the first symbol.

11. The FSK device as set forth in claim 10, wherein the decision circuitry is further capable of deciding the logic level of the second symbol by comparing the signal level of the center sample of the second symbol and the mean signal level of the auto-correlation function.

12. The FSK device as set forth in claim 11, wherein the decision circuitry is further capable of deciding the logic level of the third symbol by comparing the signal level of the center sample of the third symbol and the mean signal level of the auto-correlation function.

13. The FSK device as set forth in claim 12, wherein:

in response to determining that the second symbol, the first symbol, and the third symbol comprise a 010 sequence of symbols, the decision circuitry is capable of comparing the signal level of the center sample of the first symbol with at least one of (i) a signal level of a preceding sample of the first symbol and (ii) a signal level of a following sample of the first symbol to determine a location of the positive-going peak of the auto-correlation function corresponding to the first symbol; and in response to determining that the second symbol, the first symbol, and the third symbol comprise a 101 sequence of symbols, the decision circuitry is capable of comparing the signal level of the center sample of the first symbol with at least one of (i) a signal level of a preceding sample of the first symbol and (ii) a signal level of a following sample of the first symbol to determine a location of the negative-going peak of the auto-correlation function corresponding to the first symbol.

14. A method, comprising:

demodulating an incoming frequency-shift-keyed (FSK) signal and generating a baseband signal;

sampling the baseband signal and generating an auto-correlation function, the auto-correlation function having a positive-going peak approximately coinciding with a center of a Logic 1 symbol in the baseband signal and having a negative-going peak approximately coinciding with a center of a Logic 0 symbol in the baseband signal; and deciding a logic level of a first symbol using the auto-correlation function wherein deciding the logic level of the first symbol comprises comparing a signal level of a center sample of the first symbol and a mean signal level of the auto-correlation function.

15. The method as set forth in claim 14, wherein deciding the logic level of the first symbol further comprises at least one of:

comparing the signal level of the center sample of the first symbol and a signal level of a center sample of a second symbol preceding the first symbol; and comparing the signal level of the center sample of the first symbol and a signal level of a center sample of a third symbol following the first symbol.

16. The method as set forth in claim 15, further comprising:

deciding the logic level of the second symbol by comparing the signal level of the center sample of the second symbol and the mean signal level of the auto-correlation function; and deciding the logic level of the third symbol by comparing the signal level of the center sample of the third symbol and the mean signal level of the auto-correlation function.

17. The method as set forth in claim 16, further comprising:

in response to determining that the second symbol, the first symbol, and the third symbol comprise a 010 sequence of symbols, comparing the signal level of the center sample of the first symbol with at least one of (i) a signal level of a preceding sample of the first symbol and (ii) a signal level of a following sample of the first symbol to determine a location of the positive-going peak of the auto-correlation function corresponding to the first symbol; and in response to determining that the second symbol, the first symbol, and the third symbol comprise a 101 sequence of symbols, comparing the signal level of the center sample of the first symbol with at least one of (i) a signal level of a preceding sample of the first symbol and (ii) a signal level of a following sample of the first symbol to determine a location of the negative-going peak of the auto-correlation function corresponding to the first symbol.

\* \* \* \* \*

UNITED STATES PATENT AND TRADEMARK OFFICE
CERTIFICATE OF CORRECTION

| | | |
|---|---|---|
| PATENT NO. | : 7,508,890 B1 | Page 1 of 1 |
| APPLICATION NO. | : 11/124913 | |
| DATED | : March 24, 2009 | |
| INVENTOR(S) | : Lawrence J. Malone et al. | |

It is certified that error appears in the above-identified patent and that said Letters Patent is hereby corrected as shown below:

Column 7, line 6, delete "4353" and replace with --435B--.

Signed and Sealed this
Twenty-sixth Day of April, 2011

David J. Kappos
*Director of the United States Patent and Trademark Office*